United States Patent
Micheli

(10) Patent No.: US 7,758,298 B2
(45) Date of Patent: Jul. 20, 2010

(54) METHOD FOR OPERATING A TURBOCOMPRESSOR

(75) Inventor: Marco Micheli, Wettingen (CH)

(73) Assignee: Alstom Technology Ltd, Baden (CH)

( * ) Notice: Subject to any disclaimer, the term of this patent is extended or adjusted under 35 U.S.C. 154(b) by 241 days.

(21) Appl. No.: 11/806,419

(22) Filed: May 31, 2007

(65) Prior Publication Data

US 2007/0253805 A1    Nov. 1, 2007

Related U.S. Application Data

(63) Continuation of application No. PCT/EP2005/056051, filed on Nov. 18, 2005.

(30) Foreign Application Priority Data

Dec. 3, 2004  (EP)  ................................. 04106275

(51) Int. Cl.
*F04D 27/02*    (2006.01)
(52) U.S. Cl. .......................................................... 415/1
(58) Field of Classification Search .................. None
See application file for complete search history.

(56) References Cited

U.S. PATENT DOCUMENTS

| | | | | |
|---|---|---|---|---|
| 3,960,463 | A * | 6/1976 | Okada et al. | 415/1 |
| 5,259,188 | A * | 11/1993 | Baxter et al. | 60/204 |
| 7,422,414 | B2 * | 9/2008 | Fujii et al. | 415/1 |
| 2004/0055310 | A1 * | 3/2004 | Mannarino | 60/794 |
| 2005/0147492 | A1 * | 7/2005 | Mahoney et al. | 415/148 |
| 2009/0074568 | A1 * | 3/2009 | Suciu et al. | 415/145 |

FOREIGN PATENT DOCUMENTS

GB    2 119 862 A    11/1983

OTHER PUBLICATIONS

PCT/ISA/210.
EPO Form 1507.0.

* cited by examiner

*Primary Examiner*—Edward Look
*Assistant Examiner*—Aaron R Eastman
(74) *Attorney, Agent, or Firm*—Buchanan Ingersoll & Rooney PC

(57) ABSTRACT

When a turbocompressor is being started and/or accelerated, in particular a compressor in a gas-turbine set, the position (VIGV) of a row of variable inlet guide vanes is varied dynamically; in particular, the row of inlet guide vanes is closed during acceleration.

11 Claims, 2 Drawing Sheets

METHOD FOR OPERATING A TURBOCOMPRESSOR

RELATED APPLICATIONS

This application claims priority under 35 U.S.C. §119 to EP Application 04106275.3 filed in Europe on Dec. 3, 2004, and as a continuation application under 35 U.S.C. §120 to PCT/EP2005/056051 filed as an International Application on Nov. 18, 2005, designating the U.S., the entire contents of which are hereby incorporated by reference in their entireties.

TECHNICAL FIELD

The disclosure relates to a method for operation of a turbocompressor.

BACKGROUND INFORMATION

While they are being accelerated to the operating rotation speed, turbocompressors and in particular axial turbocompressors have to pass through very unfavorable operating states. By way of example, turbocompressors in gas-turbine sets are operated with very low pressure ratios while being accelerated and with stepped-kinematic conditions that are very poor because of the low rotation speed. The front stages of an axial compressor therefore have to cope with poor incidence flow angles while, in contrast, the rear compressor stages are operated at the limit of their absorption capacity. Undesirable and poor flow instabilities therefore occur within the compressor. It is known from the prior art for mass-flow elements to be blown out during the compression process within a multi-stage axial compressor. It is also known, where these are provided, for rows of variable inlet guide vanes and rows of stator blades in the compressor to be moved, and in particular for a row of variable inlet guide vanes to be closed such that the mass flow being passed through is low. During operation, it is frequently found that the precautions taken do not make it possible to completely avoid the flow instabilities. The problem also occurs even when a turbocompressor is modified so as to carry a greater nominal mass flow. Hardware adaptations are then expensive and complex.

SUMMARY

One aspect of the present disclosure is directed at specification of a method of the type mentioned initially such that the disadvantages of the prior art are avoided. According to a more specific aspect, the aim is to specify a method for operation of a turbocompressor such that flow instabilities are reduced and/or suppressed during the starting and acceleration of the compressor.

One aspect of the disclosure also relates to turbocompressors which have at least one row of inlet guide vanes with a variable blade cascade, and, more specifically the disclosure also relates to multi-stage axial turbocompressors. A more specific exemplary embodiment of the disclosure relates to compressors for gas-turbine sets.

According to one aspect, the disclosure is therefore based on variation of the position of a row of variable inlet guide vanes during acceleration of the compressor. The acceleration of the compressor in this case relates in particular to the setting up or the starting of the compressor, with this compressor being accelerated from a rest state or starting from a rotation speed which is considerably below a nominal operating rotation speed of the compressor, to the nominal operating rotation speed. The expression a row of variable inlet guide vanes in the compressor should be understood as meaning, in a manner known per se as a static blade cascade which is arranged upstream of the first row of compressor rotor blades, and whose blades are mounted, for example, such that they can rotate, such that the outlet-flow direction of a fluid passing through the blade cascade in the row of inlet guide vanes can be varied. It is known that the mass flow through the compressor can be varied by movement of the row of inlet guide vanes, with the operating conditions otherwise constant. The expression that is used is closing the row of inlet guide vanes when they are being moved in a direction which leads to a reduction in the mass flow. Conversely, the expression opening of the row of inlet guide vanes is used when the blades in the row of inlet guide vanes are moved in a direction which leads to an increase in the mass flow. In one exemplary embodiment, the row of inlet guide vanes is moved towards a closed position during acceleration, in particular when the compressor is being started. In one development of the method, the row of inlet guide vanes is moved dynamically. In particular, the row of inlet guide vanes is moved a predetermined gradient over time. By way of example, the position of the row of inlet guide vanes is represented as the angle through which the blades in the cascade formed by the row of inlet guide vanes are rotated with respect to a reference position. In one exemplary embodiment the movement is thus carried out with a constant blade position angular velocity. By way of example, the method can be implemented in that the variation in the flow field which is caused by the movement of the row of inlet guide vanes, is comparatively slow but its magnitude is large damps and/or suppresses the high-frequency, lower intensity flow instabilities.

In one exemplary embodiment of the method, the row of inlet guide vanes in the turbocompressor is moved to a nominally completely open position at low rotation speeds. When the row of inlet guide vanes is completely open, the rotation speed of the turbocompressor is increased, and the row of inlet guide vanes is kept open up to a first rotation speed. The rotation speed of the tubocompressor is increased further to a second rotation speed, and the position of the row of inlet guide vanes is varied while the rotation speed is being increased from the first rotation speed to the second rotation speed, such that the position of the row of inlet guide vanes reaches a nominally closed position at the latest at the second rotation speed. The rotation speed of the turbocompressor is then increased further with the row of inlet guide vanes closed, for example up to a nominal rotation speed or a stable operating rotation speed. The nominal rotation speed or the stable operating rotation speed are characteristics of the compressor and can be defined as such by a person skilled in the art, without any problem. The nominal rotation speed can be obtained particularly easily if the compressor is a compressor in a gas-turbine set. The completely open position of the row of inlet guide vanes and the completely closed position of the row of inlet guide vanes are likewise defined on a case-by-case basis in the operating concept of the compressor, as a person skilled in the art will likewise be familiar with, without any problems. In this case, the completely open position of the row of inlet guide vanes is that which the row of inlet guide vanes assumes when the compressor is being operated at rated power and/or when the turbocompressor is being operated as a compressor in a gas-turbine set, the position for nominal full-load power of the gas-turbine set. The completely closed position is the position which is predetermined by the normal operating regime of the compressor at minimum power or, for example when a gas-turbine set is being operated on no load.

The first rotation speed and the second rotation speed are determined in one exemplary embodiment by carrying out trials on one specific compressor or on a prototype of the type of compressor, during which trials the occurrence of flow instabilities is measured. By way of example, this technique is used to experimentally determine the rotation speed at which the instabilities start to exceed a specific limit value when the row of inlet guide vanes is open. This rotation speed, or a rotation speed slightly below it, is then defined as the first rotation speed. On the other hand, a rotation speed can be determined experimentally at which the flow instabilities disappear or at least fall below a threshold value, when starting with the row of inlet guide vanes closed. This rotation speed is then defined as the second rotation speed.

The first rotation speed, beneath which the row of inlet guide vanes is kept open, is in one exemplary embodiment in the range from 25% to 50% of a nominal rotation speed. In particular, it is also in the range from 25% to 40% of the nominal rotation speed; furthermore, this rotation speed may be in the range from 30% to 40% of the nominal rotation speed and, in particular exemplary embodiments, the first rotation speed is also in the range from 30 to 35% of the nominal rotation speed, or in the range from 35% to 40% of the nominal rotation speed. In one specific exemplary embodiment, the first rotation speed occurs at around 1400 rpm and the nominal rotation speed at 3600 rpm.

The second rotation speed is, for example, in the range from 50% to 70% of the nominal rotation speed. Depending on the specific circumstances, the second rotation speed may, of course, also be in the range from 50% to 60%, or from 60% to 70%, of the nominal rotation speed. In specific exemplary embodiments, the second rotation speed is in the range from 50% to 55% of the nominal rotation speed; in other specific exemplary embodiments the second rotation speed is in the range from 55% to 60% or in the range from 60% to 65% of the nominal rotation speed. In one very specific exemplary embodiment, the second rotation speed occurs at 2080 rpm, and the nominal rotation speed at 3600 rpm. In one exemplary embodiment, in which the first rotation speed is 1400 rpm and the second rotation speed is 2080 rpm, the row of inlet guide vanes is, for example, moved from the completely open position to the completely closed position between 1400 rpm and around 2000 rpm.

In one development of the invention, the row of inlet guide vanes is moved with a constant angle gradient over time; in another development of the invention, the movement is carried out with a constant angle gradient over the rotation speed.

By way of example, the turbocompressor is controlled in order to carry out the method by means of a suitably configured control unit. By way of example, the control unit has a processor, which by suitable programming, makes it possible for the control unit to operate the turbocompressor using the method described above. According to one development, the control unit is configured appropriately by a digital code or a digital program, which is loaded in the control unit or stored in a memory within the control unit. To this extent, the disclosure also relates to a control unit which is configured in order to cause a turbocompressor to carry out a method as described above, as well as a digital program code which is suitable for configuration of a control unit in a suitable manner, the source code of a computer program such as this as well as a data-storage medium in which the program code is stored as a source code or executable code. The words data storage medium should also be understood as meaning a non-volatile memory module.

The developments and exemplary embodiments described may, of course, be combined with one another. Other developments and exemplary embodiments of the disclosure will become evident to a person skilled in the art on the basis of the exemplary embodiment described in the following text.

BRIEF DESCRIPTION OF THE DRAWING

The disclosure will be explained in more detail in the following text with reference to one exemplary embodiment, which is illustrated in the drawing, in which, in detail.

Figure 1:
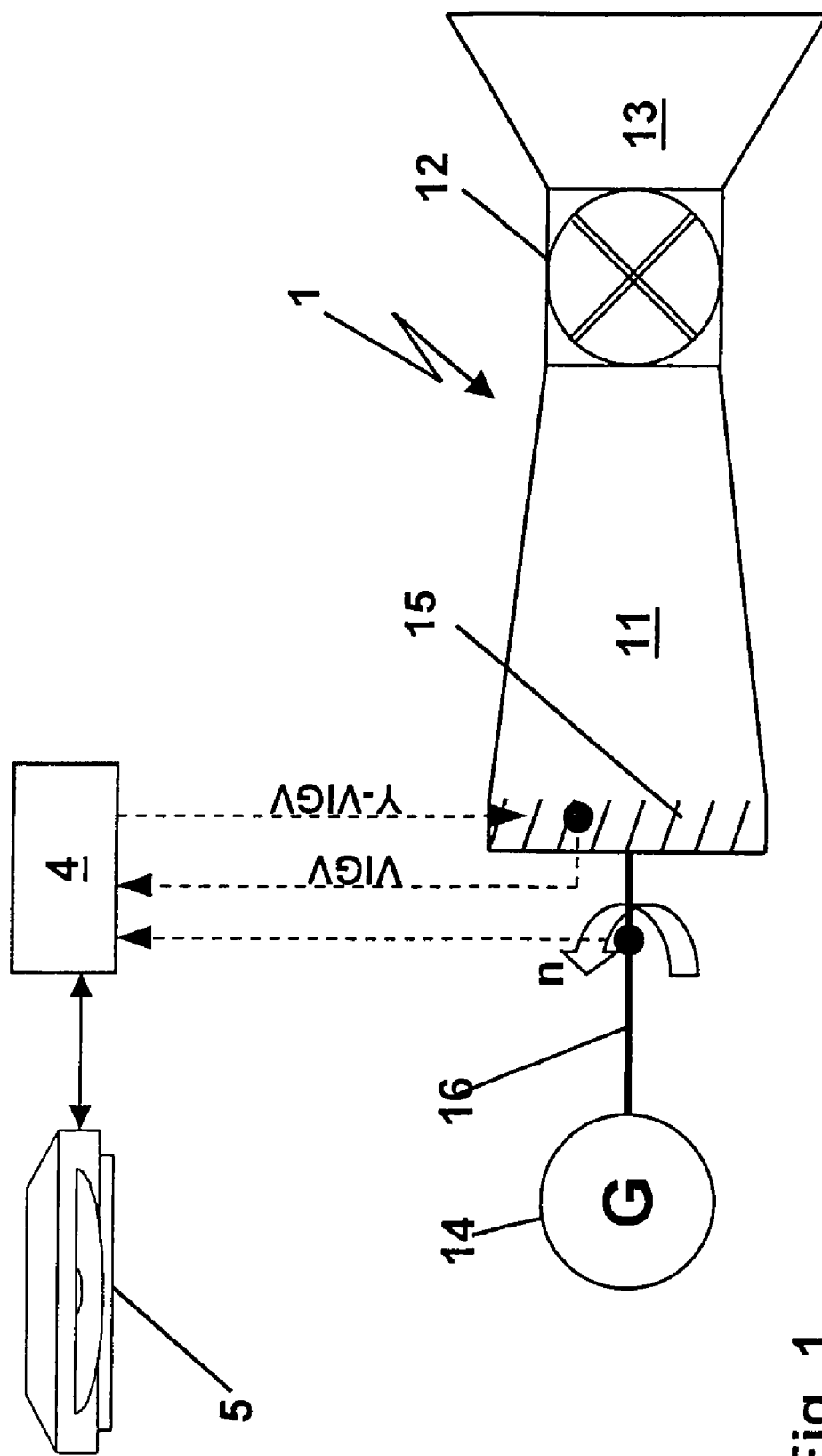
FIG. 1 shows a gas-turbine set with a turbocompressor which can be operated according to the disclosure.

The illustrations in the drawing are highly simplified; elements which are not necessary for understanding of the disclosure have been omitted. The exemplary embodiment is intended to be used for better understanding of the disclosure and is not intended to be used for restriction of the disclosure as characterized in the claims.

DETAILED DESCRIPTION

FIG. 1 shows a gas-turbine set 1 with which a person skilled in the art will be familiar per se. The gas-turbine set has a compressor 11, a combustion chamber 12 and a turbine 13. When the gas-turbine set is being operated in the power mode, a generator 14 is driven in order to generate electricity, and is coupled via the shaft 16 to the rotor, which is not illustrated explicitly, in the gas-turbine set. In the illustrated exemplary embodiment, the turbine 13 and the compressor 11 are arranged on a common shaft, which is firmly coupled to the drive shaft 16 for the generator 14. The rotation speed of the gas-turbine set is annotated n, and is predetermined to be essentially constant when the gas-turbine set is being operated in the power mode. The compressor for the gas-turbine set, which is in the form of a multi-stage axial turbocompressor, comprises a row of variable inlet guide vanes 15. The row of variable inlet guide vanes is likewise known per se from the prior art. The row of variable inlet guide vanes is used, in a manner with which a person skilled in the art will be familiar and which is described in detail elsewhere, for variation of the mass flow in the gas-turbine set when the gas-turbine set is being operated in the power mode. A control unit 4 is provided for close-loop and open-loop control of the operation of the gas-turbine set. In addition to a multiplicity of other information items that are not shown, this control unit 4 receives information about the instantaneous operating state of the gas-turbine set, about the rotation speed n of the gas-turbine set, and about the position, VIGV of the row of variable inlet guide vanes. According to one operating concept, manipulated variables for operation of the gas-turbine set are formed from these information items, such as the manipulated variable Y-VIGV for the row of variable inlet guide vanes. In one embodiment the control unit 4 is configured by a digital program to control the gas-turbine set, including the operation of the compressor and the position of the row of variable inlet guide vanes, with this digital program being stored, for example in an external data storage medium 5 and being loaded in the control unit. Instead of an external data storage medium, it is, of course, also possible to arrange a non-volatile memory module in the control unit 4, in which the code for configuration of the control unit 4 is stored.

Figure 2:
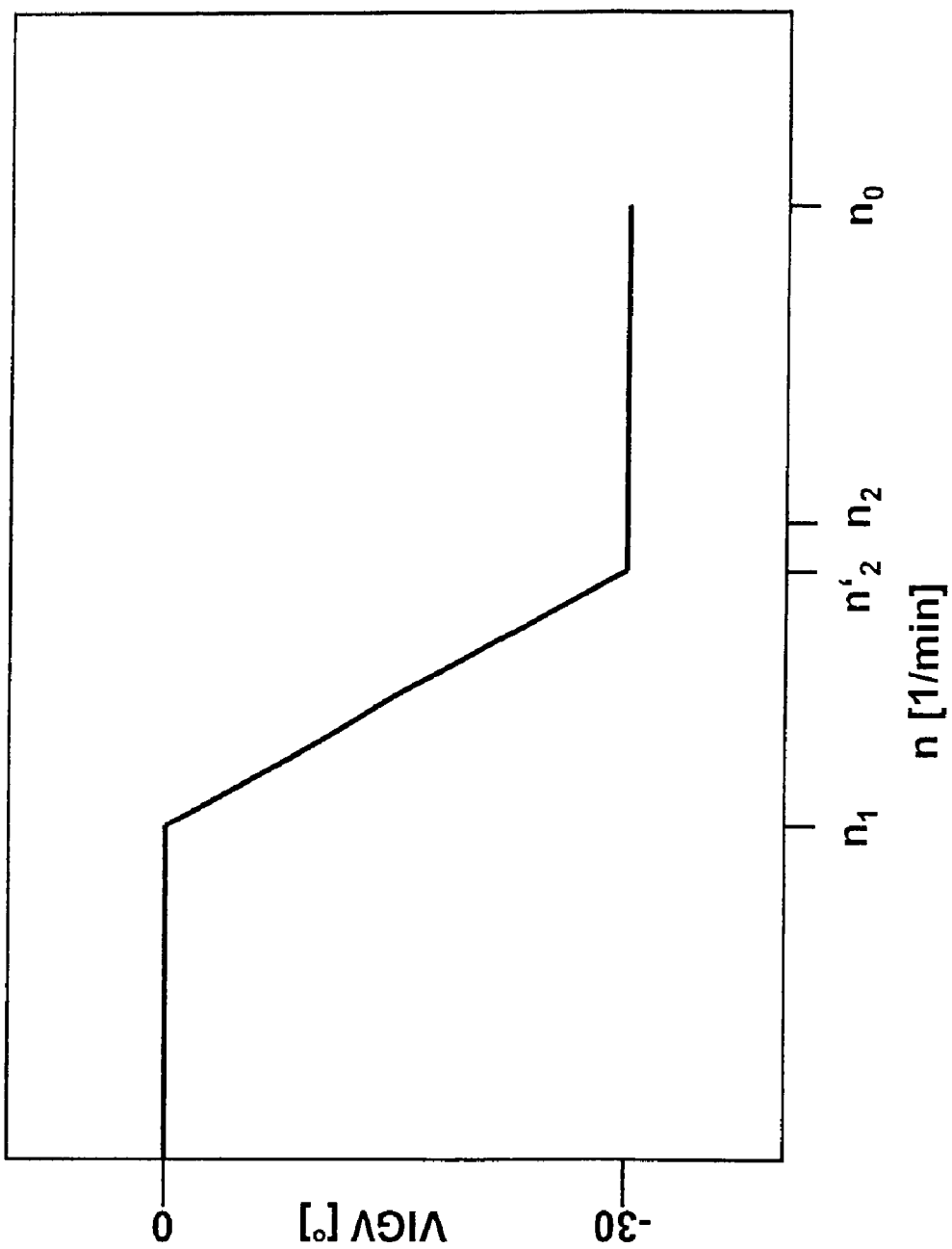
FIG. 2 shows an example of the profile of the position of the row of variable inlet guide vanes plotted against the compressor rotation speed during the starting process.

In order to start the gas-turbine set, the generator 14 is first of all operated as an electric motor. Fuel is fed to the combustion chamber 12 from a specific rotation speed; the acceleration is still assisted by the generator 14 being operated as an electric motor. During starting of the gas-turbine set, the compressor 11 passes through a rotation-speed range in which, in principle, it cannot be operated, or can be operated only inadequately. It is known for a compressor to be provided, for starting purposes, with blowing apparatuses for intermediate blowing of partially compressed air out of the compressor. Even these measures do not always make it possible to avoid flow instabilities, which cover the range from local separation phenomena to stalling of the compressor, throughout the entire rotation-speed range that has to be passed through. FIG. 2 therefore shows one example of the operating concept for operation of the row of variable inlet guide vanes during starting of the gas-turbine set, in the form of a graph. The positions of the row of inlet guide vanes are shown on the vertical axis, with an angle of 0° denoting a completely open row of inlet guide vanes, while an angle of −30° describes a row of inlet guide vanes which is closed to the maximum extent in accordance with the operating concept. The rotation speed n is plotted on the horizontal axis. The rated rotation speed of the gas-turbine set is $n_0$. The first and second rotation speeds are $n_1$ and $n_2$, and are defined on the basis of the criteria described above. During acceleration of the gas-turbine set, the row of inlet guide vanes is kept open up to the rotation speed $n_1$, and is then closed such that the row of inlet guide vanes is in the maximum-closed position above the second rotation speed $n_2$. In the exemplary embodiment, the completely closed position is in fact reached at a rotation speed $n_2'$ which occurs slightly below the second rotation speed; this is because, in this example, the movement of the row of inlet guide vanes is controlled as a function of time and not as a function of the rotation speed.

Further embodiments and developments of the invention as characterized in the claims will become evident to a person skilled in the art on the basis of these statements.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

REFERENCE SYMBOLS

1 Gas-turbine set
4 Control unit
5 Data storage medium
11 Compressor, turbocompressor
12 Combustion chamber
13 Turbine
14 Generator
15 Row of variable inlet guide vanes
16 Shaft
n Rotation speed
$n_0$ Nominal rotation speed, operating rotation speed
$n_1$ First rotation speed
$n_2$ Second rotation speed
VIGV Position of the row of variable inlet guide vanes
Y-VIGV Manipulated variable for movement of the row of variable inlet guide vanes

What is claimed is:

1. A method for operation of a turbocompressor comprising a rotation speed (n) of the turbocompressor being increased, and with a position (VIGV) of a row of variable inlet guide vanes being varied while the rotation speed is being increased, wherein the row of inlet guide vanes is kept open at a nominally open position while the rotation speed is being increased to a first rotation speed ($n_1$), wherein the rotation speed (n) of the turbocompressor is increased further to a second rotation speed ($n_2$) and the row of inlet guide vanes is varied during this increase from the first rotation speed ($n_1$) to the second rotation speed ($n_2$), wherein their position reaches a nominally closed position at the latest at the second rotation speed ($n_2$), and wherein the rotation speed (n) of the turbocompressor is increased further with the row of inlet guide vanes closed.

2. The method as claimed in claim 1, wherein the turbocompressor being operated is a compressor for a gas-turbine set.

3. The method as claimed in claim 2, wherein the nominally open position is the position of the row of inlet guide vanes when the gas-turbine set is being operated at maximum power.

4. The method as claimed in claim 2, wherein the nominally closed position is the position of the row of inlet guide vanes when the gas-turbine set is being operated on no load.

5. The method as claimed in claim 1, with the first rotation speed being in the range from 25% to 50% of a nominal rotation speed ($n_0$).

6. The method as claimed in claim 1, with the second rotation speed being in the range from 50% to 70% of a nominal rotation speed ($n_0$).

7. The method as claimed in claim 1, with the first rotation speed being a rotation speed at which flow-induced oscillation excitation would increase without the process of closing the row of inlet guide vanes.

8. The method as claimed in claim 1, with the second rotation speed being a rotation speed at which the flow instabilities end with acceleration with a constantly closed row of inlet guide vanes.

9. The method as claimed in claim 8, wherein the row of inlet guide vanes are closed over time with a constant angular gradient.

10. The method as claimed in claim 1, wherein the row of inlet guide vanes are closed over time with a constant angular gradient.

11. A method for operation of a turbocompressor comprising:
    increasing a rotation speed (n) of the turbocompressor; and
    varying a position (VIGV) of a row of variable inlet guide vanes while the rotation speed is being increased, wherein the row of inlet guide vanes is kept open at a nominally open position while the rotation speed is being increased to a first rotation speed ($n_1$), and wherein the row of inlet guide vanes vary position towards a nominally closed position as the rotation speed (n) of the turbocompressor is increased further.

* * * * *